(12) United States Patent
Reial

(10) Patent No.: US 7,822,101 B2
(45) Date of Patent: Oct. 26, 2010

(54) METHOD AND APPARATUS FOR INTERFERENCE SUPPRESSION IN A WIRELESS COMMUNICATION RECEIVER

(75) Inventor: Andres Reial, Malmö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 677 days.

(21) Appl. No.: 11/767,905

(22) Filed: Jun. 25, 2007

(65) Prior Publication Data

US 2008/0317102 A1   Dec. 25, 2008

(51) Int. Cl.
*H04L 27/30*   (2006.01)
(52) U.S. Cl. ................ 375/144; 375/148; 375/349; 370/465; 455/506; 455/65
(58) Field of Classification Search .......... 375/144, 375/148, 285, 346, 347, 349; 455/46, 501, 455/506, 63.1, 65, 67.13, 226.1–226.4, 296, 455/303; 370/252, 320, 342, 465, 479
See application file for complete search history.

(56) References Cited

U.S. PATENT DOCUMENTS

| | | | |
|---|---|---|---|
| 6,256,486 B1 * | 7/2001 | Barany et al. ............. | 455/296 |
| 6,363,104 B1 | 3/2002 | Bottomley | |
| 6,714,585 B1 | 3/2004 | Wang et al. | |
| 6,714,609 B1 * | 3/2004 | Keisala ..................... | 375/349 |
| 7,536,158 B2 * | 5/2009 | Bottomley et al. ........ | 455/135 |
| 2002/0044614 A1 * | 4/2002 | Molnar et al. ............. | 375/346 |
| 2005/0195889 A1 | 9/2005 | Grant et al. | |
| 2005/0201447 A1 | 9/2005 | Cairns et al. | |
| 2005/0215218 A1 | 9/2005 | Bottomley et al. | |
| 2006/0045170 A1 * | 3/2006 | van Rensburg et al. .... | 375/148 |
| 2006/0251156 A1 | 11/2006 | Grant et al. | |
| 2006/0268962 A1 | 11/2006 | Cairns et al. | |
| 2007/0098048 A1 | 5/2007 | Cairns et al. | |
| 2007/0153935 A1 * | 7/2007 | Yang et al. ................ | 375/267 |
| 2008/0130777 A1 * | 6/2008 | Landau et al. ............ | 375/267 |
| 2008/0205562 A1 * | 8/2008 | Jonsson et al. ........... | 375/347 |

OTHER PUBLICATIONS

Cairns, Douglas A. et al. "Low Complexity Parameter Estimation for the Generalized Rake Receiver." 2004 IEEE 11th Digital Signal Processing Workshop & IEEE Signal Processing Education Workshop, vol. 4, pp. 191-195.

(Continued)

*Primary Examiner*—Dac V Ha
(74) *Attorney, Agent, or Firm*—Coats & Bennett, P.L.L.C.

(57) ABSTRACT

According to methods and apparatus taught herein, a parametric model of received signal impairment correlations includes a parametric model term that accounts for a dominant receiver but does not result in any significant increase in parametric modeling complexity. In more detail, the parametric model models the dominant interferer as a spatial interferer, which is hypothesized as a point source of interference emanating along single-path channels to each of two or more receiver antennas. The dominant interferer thus is represented in terms of its spatial correlation across receiver antennas. The dominant interferer model term may be included in an overall model fitting process, or it may be fitted separately. Regardless, the spatial modeling approach taught herein may be used for WCDMA and other systems, and may be embodied in essentially any type of linear equalizer receiver structure.

32 Claims, 5 Drawing Sheets

OTHER PUBLICATIONS

Cairns, Douglas et al. "Experimental Evaluation of Interference Cancellation for Dual-Antenna UMTS Handset." Vehicular Technology Conference, 2005. VTC-2005-Fall. 2005 IEEE 62nd, vol. 2, pp. 877-881.

Kutz, Gideon et al. "Low Complexity Implementation of a Downlink CDMA Generalized RAKE Receiver." Vehicular Technology Conference, 2002. Proceedings. VTC 2002. 2002 IEEE 56th, vol. 3, pp. 1357-1361.

Wang, Yi-Pin Eric et al. "Generalized RAKE Reception for Cancelling Interference from Multiple Base Stations." Proceedings of IEEE VTS Vehicular Technology Conference, Fall, 2000, Boston, pp. 2333-2339.

Fulghum, T. et al. "Low Complexity Parameter Estimation for the Multi-Antenna Generalized Rake Receiver." IEEE Vehicular Technology Conference, Jan. 1, 2006, pp. 1874-1878. XP002430340.

* cited by examiner

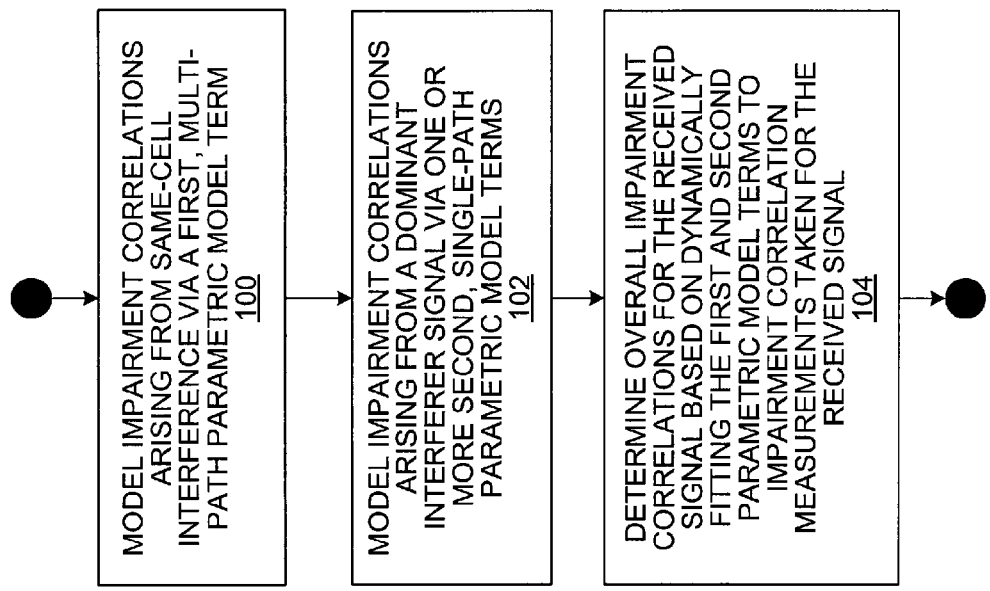
FIG. 3
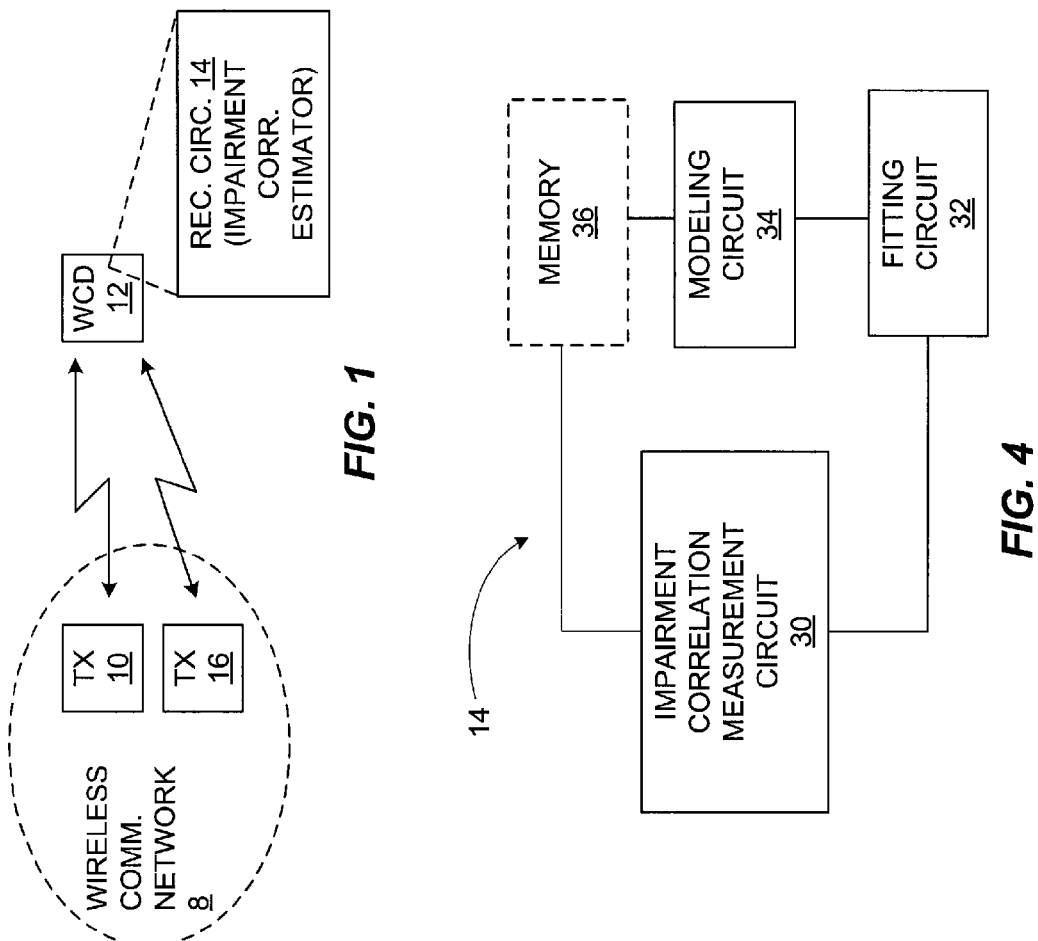
FIG. 1
FIG. 4

METHOD AND APPARATUS FOR INTERFERENCE SUPPRESSION IN A WIRELESS COMMUNICATION RECEIVER

BACKGROUND

1. Technical Field

The present invention generally relates to wireless communication receivers, such as those used in cellular and other wireless communication networks, and particularly relates to determining interference characteristics for a dominant interferer signal according to a computationally efficient model.

2. Background

"Rake" receivers, which are well known in the art of receiver design for wireless communications, exploit multipath reception for improved signal to noise ratios. In operation, each of two or more Rake fingers obtains despread values from a received CDMA (code division multiple access) signal by correlating the received signal against a known spreading sequence. By aligning the processing delay of each finger with a different path delay of the multipath signal, the Rake receiver effectively obtains a different copy of the desired signal for each delay to which a finger is assigned. Maximum ratio combining of the finger signals yields, at least in theory, a combined signal having improved signal to noise ratio as compared to the signal from any one finger.

The above "standard" Rake operation in fact works well in white noise environments, where the signal impairments, including incident interference, are uncorrelated across the fingers. Standard Rake performance becomes decidedly suboptimum in colored noise environments, where at least some components of the overall received signal impairments may be strongly correlated across the fingers. In other words, the standard Rake receiver does not perform well in terms of suppressing colored interference, where the received signal impairments across Rake fingers may exhibit significant correlations.

One efficient linear receiver structure that does achieve potentially very good suppression of colored interference is the "Generalized RAKE" (GRake) receiver. The GRake receiver implements an LMMSE solution that both reduces the effect of the dispersive channel (partially restores the lost orthogonality between the spreading codes from the desired base station) and whitens the interfering signal from other sources (neighboring cells, other systems, receiver filtering). This is achieved by accounting for the covariance of received signal impairments between the Rake fingers, where the tasks of own-cell and other interference suppression are combined optimally to achieve the largest possible reduction in the impairment signal power.

A basic presentation for one embodiment of GRake receiver operation appears in Bottomley, et al., Generalized Rake Reception for Cancelling Interference from Multiple Base Stations," IEEE Vehicular Technology Conference (2000). One may also refer to U.S. Pat. No. 6,363,104 B1 to Bottomley et al., for GRake details. Those skilled in the art will appreciate that an equivalent framework of operations may be carried out in a LMMSE (Linear Minimum Means Square Error) chip equalizer (CE), wherein receiver performance in colored noise environments is improved by considering impairment correlations between the equalization filter tap delays. The optimal weight CE solution is equal to that of GRake within a scalar multiplication.

In any case, in dispersive environments, where the colored component of interference dominates, the GRake receiver, chip equalizer, or other type of "linear equalization" receiver, may increase the SIR after (signal) combining by several dB on average. Of course, the best interference suppression is achieved if up-to-date covariance information (the "instantaneous color" of the impairment component) is used when determining the combining weights. One may refer to U.S. Pat. No. 6,714,585 B1 to Wang et al. for information related to combining weight generation that consider received signal impairment correlations.

Rather than directly calculating received signal impairment correlations, it is known to represent received signal impairments according to a parametric model that is dynamically "fitted" to ongoing observations of impairment, which may be short-term, somewhat "noisy" snapshots of received signal impairment. In more detail, in the parametric GRake receiver, an overall received signal covariance matrix is constructed based on available channel information and is expressed as the combination of various constituent components of impairment. The relative weights (fitting parameters) of these components are determined dynamically, such as by fitting the model terms to ongoing impairment correlation measurements. One may refer to U.S. Published Application 2005/0201447 A1 to Cairns et al. for examples of parametric model-based impairment correlation processing.

As a key aspect, the parametric model based approach only accounts for the components of received signal impairment correlation that it explicitly models. If a significant fraction of the interference experienced by a given parametric-model based receiver comes from an un-modeled source of interference, then receiver performance can suffer significantly. For example, if a significant portion of interference at the receiver comes from a neighboring cell, then, in order to suppress it, the receiver needs a representation for the other cell interference in its parametric model. This approach is illustrated, for example, in the co-pending and commonly assigned patent application, entitled, "Method and Apparatus for Extended Least Squares Estimation for Generalized Rake Receiver Parameters Using Multiple Base Stations," filed on 12 Dec. 2006, assigned Ser. No. 11/609,373, and now published as U.S. 2007/0098048 A1. In addition to the own cell interference, that application teaches fully modeling the interference arising from a neighboring cell using the same multipath signal structure.

While the performance gains associated with including additional parametric model terms may be significant, there is an unavoidable, potentially significant increase in computational complexity. As such, the desire or need to suppress multiple sources of interference giving rise to correlated impairments in a linear equalization environment must be balanced against the need to keep the computational complexity within the bounds that are reasonable for the signal processing (time and/or computational capability) and power consumption constraints at play in a given application.

SUMMARY

Supplementing a parametric model of received signal impairment correlations with a model term that provides spatial nulling for a dominant spatial interferer without incorporating multipath channel complexities provides for effective interference suppression of the spatial interferer with minimal added complexity. As such, the receiver implementation is not computationally burdensome. In particular, when used in a mobile station context, the implementation increases the effective geometry factor enjoyed by the receiver, tends to increase data throughput, and lowers the base station transmit power required to achieve a given data throughput, without significantly increasing the mobile station's parametric modeling calculations.

In one embodiment, a method of determining received signal impairment correlations for use in processing a received signal at a wireless communication device comprises modeling impairment correlations arising from same-cell interference via a first, multipath parametric model term, and modeling impairment correlations arising from a dominant interferer signal via one or more second, single-path parametric model terms that treat the dominant interferer signal as a point source signal emanating along single paths to each of two or more receiver antennas. The method continues with determining overall impairment correlations for the received signal based on dynamically fitting the first and second parametric model terms to impairment correlation measurements taken for the received signal.

The above method and variations of it may be implemented in a receiver circuit, which may comprise hardware, software, or any combination thereof. For example a baseband digital signal processor may be configured to carry out the method as part of overall received signal processing. In this regard, the receiver circuit may be part of a linear equalizer, such as a GRake receiver or CE receiver. In one or more such embodiments, the overall impairment correlations are used to form combining weights for suppressing received signal interference.

Of course, the present invention is not limited to the above contexts, nor is it limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 1 is a block diagram of one embodiment of a wireless communication network and an associated wireless communication device, which includes a receiver circuit for parametrically modeling a dominant interferer.

FIG. 3 is a logic flow diagram of one embodiment of processing logic for parametrically modeling a dominant interferer signal.

FIG. 4 is a block diagram of circuit details for one embodiment of a receiver circuit configured to provide parametric modeling of a dominant interferer.

DETAILED DESCRIPTION

Figure 2:
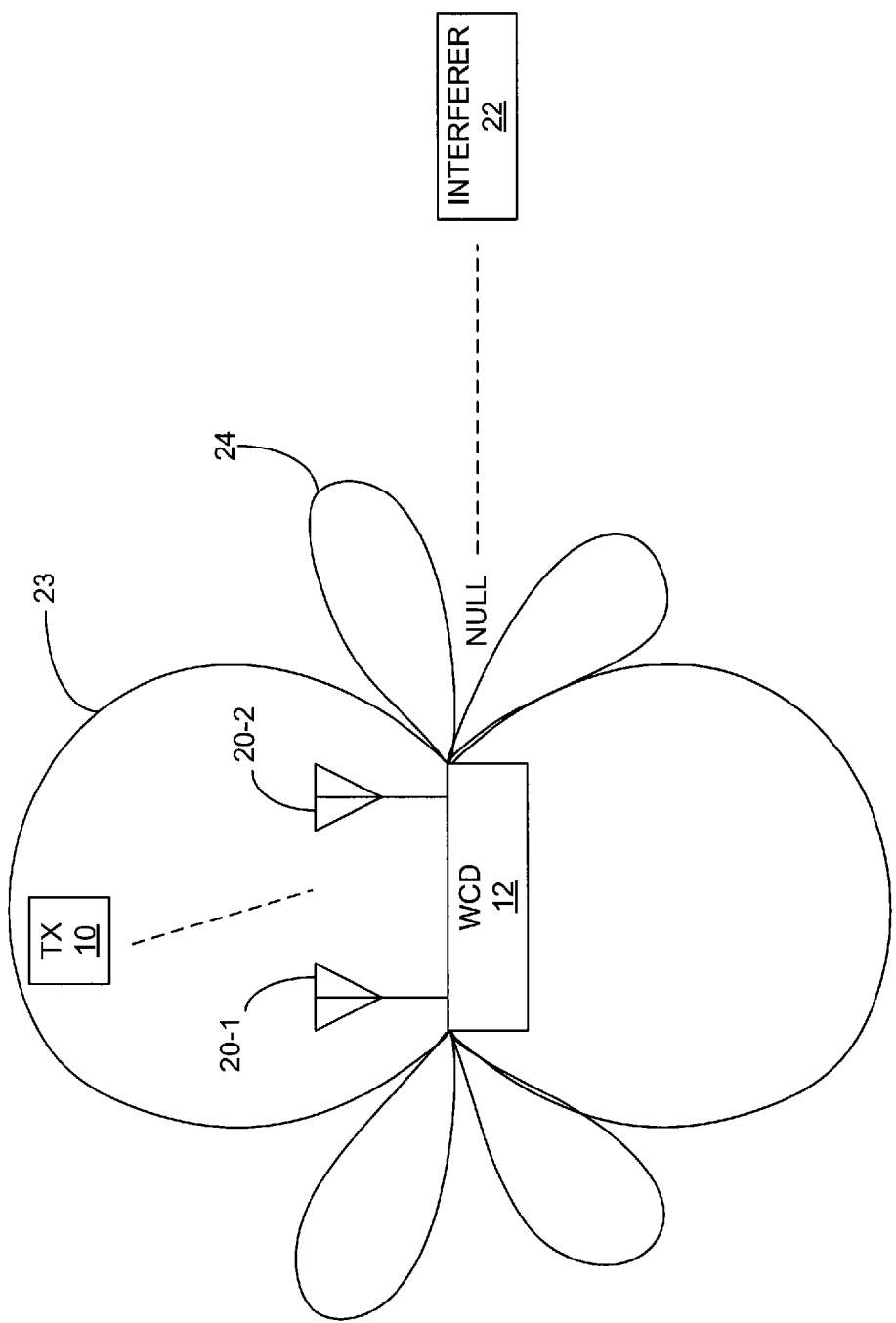
FIG. 2 is a diagram of one embodiment of a wireless communication device that provides parametric modeling of a dominant interferer, shown in context with a desired-signal transmitter and a (dominant) interfering transmitter.

FIG. 1 illustrates a wireless communication network 8, such as a cellular communication network, as a non-limiting context for advantageously practicing dominant interferer cancellation as taught herein. The illustrated wireless communication network 8 includes a transmitter 10 providing wireless communication support for a wireless communication device 12, which may comprise some form of a mobile station (e.g., a cellular radiotelephone, a pager, a PDA, a network access card or module, etc.).

The wireless communication device 12 includes a receiver circuit 14, which may be functionally implemented in hardware, software, or any combination thereof. The receiver circuit 14 (also referred to as an "impairment correlation estimator") maintains a parametric model of received signal impairment correlations that accounts for various sources or types of received signal impairment. Here, "impairment" in the general sense represents essentially any form of received signal distortion manifested at the wireless communication device 12, including interference and noise. Impairment in the context of the impairment correlation estimation by the receiver circuit 14 refers to any source of signal impairment accounted for in the parametric model of impairment correlations provided by the receiver circuit 14.

In contexts where multipath copies of the received signal are combined across different processing delays, knowledge of how signal impairments correlate across those delays enables the formulation of combining weights that suppress the correlated impairments. Thus, the remainder of this discussion refers to the receiver circuit 14 as the "impairment correlation estimator" 14, and it should be understood that its determination of impairment correlations can be used in interference suppression operations.

Of particular interest herein, the impairment correlation estimator 14 uses a parametric model of overall received signal impairment correlations that provides practically all of the (interference suppression) benefit that would be obtained by explicitly and fully modeling a dominant source of interference, such as an adjacent or nearby network transmitter 16, without requiring the computational complexity associated with fully modeling such interference. According to methods and apparatuses taught herein, a dominant interferer signal is modeled as a spatial interferer, i.e., it is treated as a point-source of interference emanating along single-path propagation channels to each of two or more receiver antennas provided at the wireless communication device 12.

That is, the impairment correlation estimator 14 uses a simplified, spatial representation of a dominant interferer signal, rather than attempting to parametrically model the full, multipath structure of the interfering signal. By foregoing full (multipath) modeling, which would capture temporal impairment correlations arising from dispersive channel signal propagation, the impairment correlation estimator 14 provides a parametric model of received signal impairment correlations that accounts for the impairment correlations arising from a dominant, single interferer with minimal additional computational complexity.

Specifically, the teachings herein are based on the recognition that, in many actual reception cases, the detailed structure of a dominant interferer signal is not particularly important, as most of the interfering, multipath rays arrive from roughly the same direction. Alternatively, even if there is significant local scattering, there is often one path (arrival direction) that contributes the dominant interference. In other words, significant interference suppression at the wireless communication device 12 may be achieved by steering a "common" null in the interfering direction (as opposed to a "per path" null in the fully modeled case). This common null steering provides most of the spatial suppression gains.

FIG. 2 illustrates common null steering according to an embodiment of dominant interferer suppression as taught herein. More particularly, FIG. 2 illustrates an embodiment of the wireless communication device 12 having two receiver antennas 20-1 and 20-2. However, those skilled in the art will appreciate that a greater number of receiver antennas could easily be implemented and used in the context of dominant interferer suppression as taught herein. In any case, one sees that a form of "beamforming" is practiced at the wireless communication device 12 as a result of the above-described common null steering, wherein a reception null is aligned along a single path to an interfering transmitter 22, which may be part of the communication network 8, or which may be a "rouge" transmitter. The task of determining where to steer that null (between reception lobes 23 and 24) may be completed by the impairment correlation estimator 14 using an algorithm that identifies or otherwise tends toward a solution that yields an overall direction having the greatest suppression effect.

To understand this, it may help to explain the parametric model maintained by the impairment correlation estimator 14 in one or more embodiments, to determine the received signal impairment correlations. In at least one embodiment, the parametric model of overall received signal impairment correlations includes at least a first, multipath parametric model term modeling impairment correlations arising from same-cell interference, and a second, single-path parametric model term modeling impairment correlations arising from a dominant interferer. One possible formulation is shown below, $$R_u = \sum_k \alpha^{(k)} R^{(k)} + \gamma R_{di} \qquad \text{Eq. (1)}$$

where $$\sum_k \alpha^{(k)} R^{(k)}$$

is the first parametric model term and $\gamma R_{di}$ is the second parametric model term. The first model term fully models temporal and spatial correlations for multipath same-cell interference over k same-cell signals differentiated by their origins, e.g., different source antennas, precoding, beamforming, and/or channelization code reuse options. The $\alpha^{(k)}$ represents a model fitting parameter for the k-th component of the first parametric model term. In contrast, rather than taking on the complexity of multipath-based modeling of the impairment correlations arising from the dominant interferer signal, the second model term model simplifies the parametric representation by modeling only the spatial correlations associated with the dominant interferer signal, between two or more receiver antennas (e.g., 20-1 and 20-2) for the same processing delays—i.e., the correlation of impairments at a first delay on a first receiver antenna with the impairments at that same delay on a second receiver antenna. Here, $\gamma$ serves as a fitting parameter for the second model term.

In a more complete representation, which may be advantageously used by one or more embodiments of the impairment correlation estimation circuit 14, the parametric model of overall impairment correlations may be expressed as, $$R_u = \sum_k \alpha^{(k)} R^{(k)} + \beta R_n + \gamma R_{di} \qquad \text{Eq. (2)}$$

where the third model term $R_n$ provides a collective, white-noise representation of other-cell interference, background noise, thermal noise, etc. Here, $\beta$ serves as a fitting parameter for $R_n$.

With the above parametric model in mind, FIG. 3 illustrates one embodiment of processing logic that may be implemented by the receiver circuit 14, for carrying out the proposed parametric model-based determination of overall impairment correlations for a received signal. While sequential processing is illustrated, it should be understood that, at least where possible, such processing may be carried out in a different order, and at least some processing actions may be carried out concurrently.

Further, the entire process, which may be carried out in hardware, software, or any combination thereof, may comprise part of a larger set of processing operations being carried out at the wireless communication device 12. For example, FIG. 4 illustrates one embodiment of a circuit arrangement for the impairment correlation estimator 14, which may represent a physical hardware realization or a functional programmatic realization (e.g., software, microcode).

The illustrated circuit embodiment comprises an impairment correlation measurement circuit 30, to measure impairment correlations, such as from despread pilot symbol values. These measurements serve as observations for dynamically adapting the fitting parameters of the parametric model. The impairment correlation estimator 14 further includes a fitting circuit 32 to "fit" the parametric model of impairment correlations to the observations (possibly filtered) provided by the circuit 30, and a modeling circuit 34 to provide or otherwise maintain the parametric model terms. For example, the modeling circuit 34 may store data structures or other representations of the parametric model terms, which may be covariance matrices or other structured matrices. Memory 36, which may be one or more devices, e.g., volatile working memory and non-voltage data and program memory, may be used to maintain parametric model information.

In any case, returning to FIG. 3, the illustrated processing begins with modeling impairment correlations arising from same-cell interference via the above-described first model term (Step 100) and modeling impairment correlations arising from the dominant interferer via the above-described second model term (Step 102). White-noise modeling of other-cell and background/thermal noise via the third model term also may be carried out as part of the illustrated processing. In any case, processing continues with determining the overall impairment correlations for the received signal based on dynamically fitting the first and second model terms to impairment correlation measurements taken for the received signal (Step 104). That is, the fitting parameters for the modeled impairment correlation terms may be adapted in one or more fitting processes, e.g., a Least Squares (LS) fitting process, that is driven by actual, short-term observations of received signal impairment. Such observations may be obtained, for example, from received pilot symbols.

Figure 5:
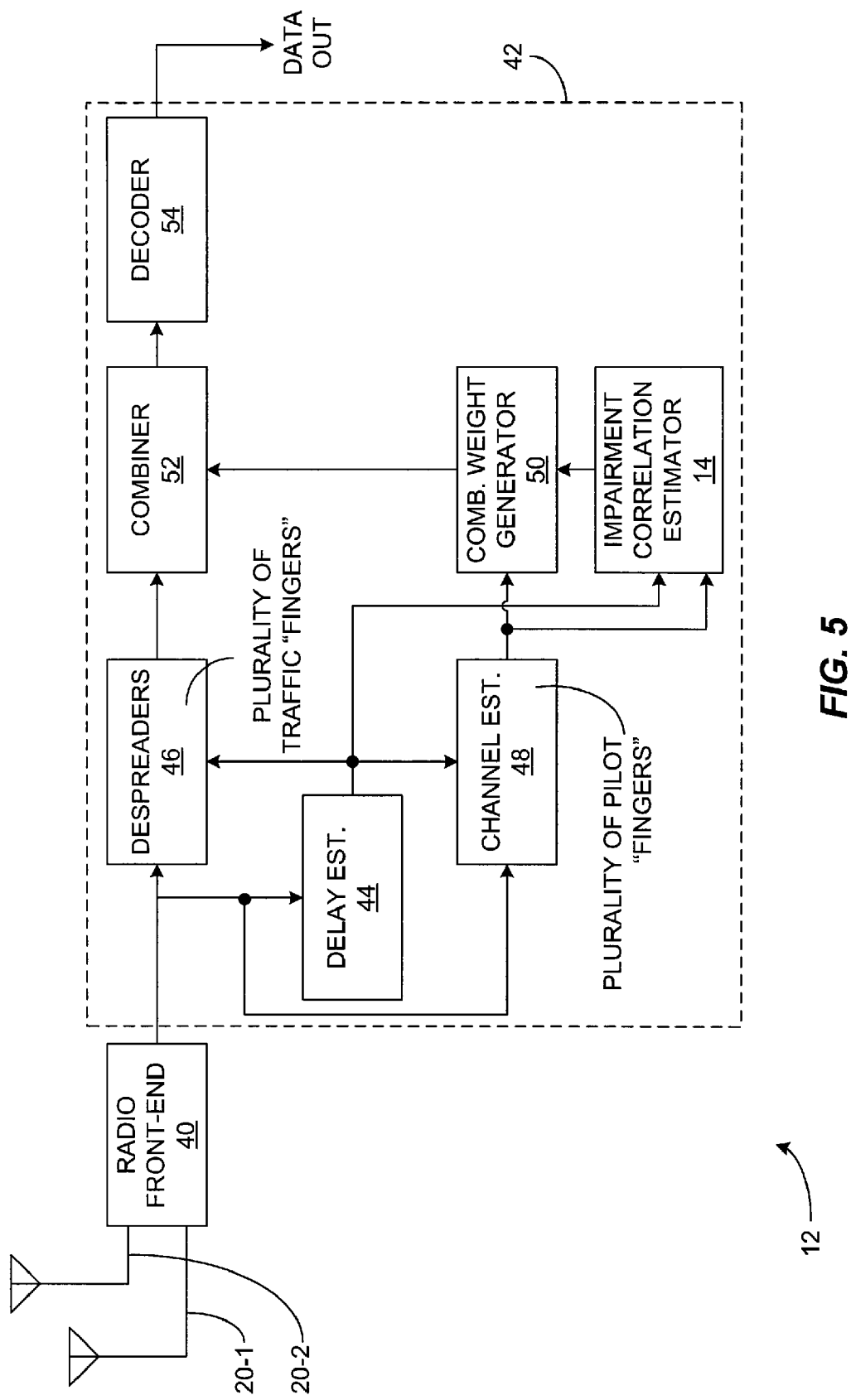
FIG. 5 is a block diagram of one embodiment of a Generalized Rake (GRake) configuration of the wireless communication device of FIGS. 1 and 2.

To provide a more detailed, but non-limiting context for discussing the above operations, FIG. 5 illustrates an embodiment of the wireless communication device 12, which includes a radio front-end 40 and a baseband processing circuit 42, e.g., one or more digital signal processors, microprocessors, ASICs, or other digital processors. Here, the baseband processing circuit 42 is configured as a GRake receiver that is configured for suppression of interference arising from a dominant interferer by virtue of its inclusion of an embodiment of the previously introduced impairment correlation estimator 14.

In more detail, the radio front-end 40 (filters, digitizers, etc.) is coupled to multiple receiver antennas. Receiver antennas 20-1 and 20-2 are shown for discussion. The radio front-end 40 provides digital sample streams, preferably at baseband frequencies, corresponding to the received signal as received on each receiver antenna. These digital sample streams flow into the baseband processing circuit 42, which in the illustrated GRake embodiment includes a delay estimator 44, despreaders 46, a channel estimator 48, a combining weight generator 50, a combiner 52, and a decoder 54.

In operation, the delay estimator 44 estimates multipath delays of the received signal. These delays are used for aligning individual ones of the despreaders 46 with the multipath delays of the received signal for despreading desired signal components from the received (CDMA) signal. More generally, the despreaders 46 comprise a plurality of code-based signal correlators capable of correlating the received signal to specific spreading codes at specific delay offsets, as determined by the delay estimator 44. The despreaders 46 also are referred to as Rake fingers, and a number of them are generally used as "probing" fingers which are not necessarily aligned with multipath delays of the received signal, but rather are used to better characterize received signal interference in terms of its correlation across the fingers.

In one or more embodiments, the channel estimator 48 includes more Rake fingers, operated as pilot despreaders, or a subset of the despreaders 46 provide despread pilot values to the channel estimator 48. In either case, the channel estimator 48 estimates multipath channel characteristics for the received signal from despread pilot values, and provides channel estimate information to the combining weight generator 40, which also receives overall impairment correlation estimates, as represented in the dynamically updated parametric model of received signal impairment correlations maintained by the impairment correlation estimator 14.

The combining weights generated by the combining weight generator 50 therefore incorporate knowledge of the spatial correlations of the dominant interferer signal, for like processing delays (e.g., like finger positions) across the receiver antennas 20. The combiner 52 combines multipath copies of the desired components of the received signal, as output by selected ones of the despreaders 46, using the generated combining weights. Doing so effects suppression of interference arising from the dominant interferer signal, and effects suppression of other correlated interference as represented in the parametric model of impairment correlations maintained by the impairment correlation estimator 14.

To understand the above GRake processing in more detail, it may be helpful to begin with an assumption of chip-spaced processing delays, e.g., Rake finger processing delays that align with the chip periods used in transmission spreading. In this case the impact of receiver pulse shaping may be ignored. For simplicity, let the 2N GRake probing fingers for own-cell reception lie at N delays and let fingers 2n and 2n+1 correspond to delay n at the first and second antennas respectively. Then we have the 2N×2N covariance matrices $R_n$ and $R_{di}$, where the first is diagonal $R_n = N_0 I$, which follows known noise covariance matrix formulations.

However, according to the teachings herein, the dominant interferer is represented as a point source that has a particular spatial orientation. The second matrix thus contains the diagonal values that describe the power of the spatial interferer, $$R_{di}(2n,2n) = |c_0|^2, R_{di}(2n+1, 2n+1) = |c_1|^2 \qquad \text{Eq. (3)}$$

where $c_i$ are some complex values that may be interpreted as the "effective" (single-path) channel coefficients of the dominant interferer at the i-th antenna. With reference to FIG. 5, it will be understood that $c_0$ represents a single-path channel coefficient relating the receiver antenna 20-1 to the dominant interferer in the context of its point source spatial representation. $R_{di}$. Likewise, $c_1$ represents the single-path channel coefficient relating the receiver antenna 20-2 to the dominant interferer. Thus, Eq. (3) will be understood as a two receiver antenna example, but those skilled in the art will appreciate its ready extension to more than two receiver antennas.

Note that $R_{di}$ also contains non-zero correlation values for all finger pairs at the same delay: $R_{di}(2n, 2n+1) = c_0 c_1^*$. E.g. for N=2 delays, $$R_{di} = \begin{bmatrix} |c_0|^2 & c_0 c_1^* & 0 & 0 \\ c_1 c_0^* & |c_1|^2 & 0 & 0 \\ 0 & 0 & |c_0|^2 & c_0 c_1^* \\ 0 & 0 & c_1 c_0^* & |c_1|^2 \end{bmatrix} \qquad \text{Eq. (4)}$$

One notes from Eq. (4) that $R_{di}$ comprises a spatial interference matrix having zero elements everywhere except for blocks of self-correlation and cross-correlation matrix elements down its diagonal for the single-path channel coefficients for the two receiver antennas. Here, where the spatial correlations of the dominant interferer signal are considered between two receiver antennas, the diagonal blocks are 2×2. The block dimensions extend directly when extending the representation to more than two receiver antennas. For example, if spatial correlations of the dominant interferer across five receiver antennas was considered, then $R_{di}$ would comprise a 10×10 matrix having 5×5 blocks down its diagonal.

Another notable point, at least in terms of computational efficiency, is that all non-zero elements in $R_{di}$ as given in Eq. (4) depend directly on the single-path channel coefficients $c_0$ and $c_1$. In at least some instances, these coefficients are known by virtue of other receiver operations, such that their use in determining impairment correlations for the dominant interferer requires no "extra" channel estimation processing. For example, the wireless communication device 12 may be in soft handoff on the forward link, wherein more than one network transmitter transmits data to it. In such cases, the wireless communication device 12 will, via the channel estimator 48, maintain estimates for the multipath channels relating to the network transmitters (e.g., base stations) serving it in soft handoff.

Thus, where multipath channel coefficients for a dominant interferer are known, the impairment correlation estimator 14 can be configured to carry out a method wherein it obtains the single-path representation for modeling the spatial correlations arising from the dominant interferer. That is, modeling the impairment correlations arising from the dominant interferer signal via one or more single-path parametric model terms may be based on determining single-path channel coefficients for use in the second parametric model terms from the multipath channel estimates maintained for the interfering transmitter. For example, determining the single-path channel coefficients (from the known multipath coefficients) may comprise identifying, for each of the two or more receiver antennas, a strongest one of the multipath channel coefficients. Alternatively, determining the single-path channel coefficients may comprise forming a single-path "composite"

channel coefficient for each of the two or more receiver antennas, based on corresponding ones of the multipath channel coefficients. Other such methods may be used, and it should be broadly understood that available multipath channel coefficients relating an interfering transmitter to respective ones of the receiver antennas can be used to obtain a single-path channel representation for purposes of modeling the dominant interferer as a point-source spatial interferer.

The resulting single path will often be a reasonably good representation of the interfering transmitter in terms of its interference output. By using the one-path model for the interfering transmitter, which may be an other-cell or other-sector transmitter, the $R_{di}$ matrix may be constructed in a computationally simplified manner. That is, by limiting the number of paths considered in the dominant interferer parametric model term to just one, the construction complexity is only a small fraction of the full-scale implementation used for the $\alpha^{(k)}R^{(k)}$. The fitting parameter $\gamma$ for $R_{di}$ may then be found by using a standard LS procedure.

Of course, in at least some cases, the channel coefficients for the dominant interferer will not be known. Indeed, a truly dominant interferer may not actually exist, which is fine in the context of the modeling approach proposed herein, because the fitting procedures used to determine the spatial interferer model term can be undertaken in a manner that does not compromise the fitting of the $\alpha^{(k)}R^{(k)}$ and $\beta R_n$ terms.

In a general formulation, which allows for fitting solutions even for unknown interferers, the $R_{di}$ matrix can be expressed as, $$R_{di} = \begin{bmatrix} |c_0|^2 & c_0 c_1^* & 0 & 0 \\ c_1 c_0^* & |c_1|^2 & 0 & 0 \\ 0 & 0 & |c_0|^2 & c_0 c_1^* \\ 0 & 0 & c_1 c_0^* & |c_1|^2 \end{bmatrix} = \quad \text{Eq. (5)}$$

$$|c_0||c_1| \begin{bmatrix} \frac{|c_0|}{|c_1|} & e^{j\Delta\varphi} & 0 & 0 \\ e^{-j\Delta\varphi} & \frac{|c_1|}{|c_0|} & 0 & 0 \\ 0 & 0 & \frac{|c_0|}{|c_1|} & e^{j\Delta\varphi} \\ 0 & 0 & e^{-j\Delta\varphi} & \frac{|c_1|}{|c_0|} \end{bmatrix}$$

In Eq. (5), the impairment correlation estimator 14 must deal with a number of unknowns, including the magnitudes of the interferer powers $|c_i|$ and their phase difference $\Delta\varphi = \angle c_1 - \angle c_0$. At least for static reception environments, estimation of fitting parameters for the $R_{di}$ term may be decoupled from estimation of the other model fitting parameters. For example, the $R_{di}$—related parameters may be fitted while treating the remaining fitting parameters as constants.

Thus, determining the overall impairment correlations for the received signal based on dynamically fitting the first and second parametric model terms to the impairment correlation measurements taken for the received signal comprises carrying out a separate first and second fitting processes, said first fitting process involving model fitting parameters not associated with the spatial interference matrix (i.e., the $\alpha^{(k)}$ and $\beta$ fitting parameters for the $R^{(k)}$ and $R_n$ model terms in the given example) and said second fitting process involving model fitting parameters associated with the spatial interference matrix (i.e., the $\gamma$ fitting parameter for the $R_{di}$ model term).

As one possible alternative formulation, the impairment correlation estimator 14 can be configured to decompose the $R_{di}$ matrix into trivial components as, $$R_{di} = |c_0|^2 I + (|c_1|^2 - |c_0|^2) \begin{bmatrix} 0 & 0 & 0 & 0 \\ 0 & 1 & 0 & 0 \\ 0 & 0 & 0 & 0 \\ 0 & 0 & 0 & 1 \end{bmatrix} + \quad \text{Eq. (6)}$$

$$|c_1||c_0|\cos(\Delta\varphi) \begin{bmatrix} 0 & 1 & 0 & 0 \\ 1 & 0 & 0 & 0 \\ 0 & 0 & 0 & 1 \\ 0 & 0 & 1 & 0 \end{bmatrix} +$$

$$|c_1||c_0|\sin(\Delta\varphi) \begin{bmatrix} 0 & j & 0 & 0 \\ -j & 0 & 0 & 0 \\ 0 & 0 & 0 & j \\ 0 & 0 & -j & 0 \end{bmatrix}$$

where the scaling factors of each of the four decomposed components of $R_{di}$ may be treated as traditional (parametric model) fitting parameters—i.e., the $|c_0|$, $(|c_1|^2-|c_0|^2)$, $|c_1||c_0|\cos(\Delta\varphi)$, and $|c_1||c_0|\sin(\Delta\varphi)$ fitting parameters for the corresponding four spatial correlation matrices given in Eq. (6). Notably, fitting of first term appearing in the decomposed representation of $R_{di}$ as given in Eq. (6) may be lumped together with the $R_n$ matrix and their joint fitting parameters may be estimated in one step. Thus, the decomposed approach only necessitates estimation of the three remaining fitting parameters to solve for in addition to determining the $\alpha^{(k)}$ and $\beta$ fitting parameters for the $R^{(k)}$ and $R_n$ model terms, respectively.

The above decomposed approach may be understood as forming the spatial interference matrix $R_{di}$ as the function of the relative magnitudes of the single-path channel coefficients and their relative phase differences based on forming a structured set of constant-valued spatial interference matrices, each having a scaling value that is a function of any one or more of the relative phase differences and the single-path channel coefficients. That is, the actual matrix elements in the matrices of Eq. (6) are constant values, while the scaling values (i.e., the fitting parameters) for those matrices are direct functions of the single-path channel coefficients, expressed in terms of magnitude and phase.

As such, determining the overall impairment correlations for the received signal based on dynamically fitting the first and second parametric model terms to the impairment correlation measurements taken for the received signal comprises, in one or more embodiments, treating the scaling values for the spatial interference matrices as parametric model fitting parameters, such that the single-path channel coefficients and their relative phase differences are implicitly solved via a model fitting process. That is, the implicit solution yields fitting parameter values corresponding to the single-path channel coefficients and relative phases spatially relating the receiver antennas to the dominant interferer, without requiring that the single-path channel coefficients and phases be explicitly solved for.

As post-processing to fitting parameter estimation, known relationships between the parameters may be used as constraints to improve consistency. Also, it is worth noting that the requirement to determine additional fitting parameters, such as when Eq. (6) is used, may have an adverse impact on the overall estimation quality of all fitting parameters—e.g., an LS fitting process may yield less favorable results when using the same set or size of observational data to estimate a greater number of fitting parameters. Therefore, to reduce the number of fitting parameters to be determined, the impairment correlation estimator 14 can be configured to exploit the fact that the main dominant interferer suppression gain comes from correctly identifying the dominant interferer's location and correspondingly steering a reception null in that direction.

As such, the relative strengths of the effective, single-path channel estimates $|c_i|$ used in spatially modeling the dominant interferer primarily affect the combining weight magnitudes for the individual Rake fingers, but not the spatial steering function. Note, too, that extreme differences between $|c_i|$ do not occur in practical receiver structures where the receiver antennas are not completely uncorrelated. This fact can be exploited in contexts where the impairment correlation estimator 14 models the impairment correlations arising from the dominant interferer signal via the one or more second, single-path parametric model terms based on forming a spatial interference matrix as a function of the relative magnitudes of the single-path channel coefficients and their relative phase differences, e.g., the representation given in Eq. (5). In such representations, the impairment correlation estimator 14 can simplify computations by reducing one or more matrix elements of the spatial interference matrix to unity by assuming equal relative magnitudes for the single-path channel coefficients. In other words, by assuming, in the two antenna case, that $|c_0|=|c_1|$, the ratio terms involving the single-path channel magnitudes in the matrix of Eq. (5) become unity.

The expression below shows the simplified form of Eq. (5), wherein the interference model is rewritten as, $$R_{di} = |c|^2 \begin{bmatrix} 1 & e^{j\Delta\varphi} & 0 & 0 \\ e^{-j\Delta\varphi} & 1 & 0 & 0 \\ 0 & 0 & 1 & e^{j\Delta\varphi} \\ 0 & 0 & e^{-j\Delta\varphi} & 1 \end{bmatrix} \quad \text{Eq. (7)}$$

or rewritten as, $$R_{di} = |c|^2 I + |c|^2 \cos(\Delta\varphi) \begin{bmatrix} 0 & 1 & 0 & 0 \\ 1 & 0 & 0 & 0 \\ 0 & 0 & 0 & 1 \\ 0 & 0 & 1 & 0 \end{bmatrix} + \quad \text{Eq. (8)}$$

$$|c|^2 \sin(\Delta\varphi) \begin{bmatrix} 0 & j & 0 & 0 \\ -j & 0 & 0 & 0 \\ 0 & 0 & 0 & j \\ 0 & 0 & -j & 0 \end{bmatrix}$$

$$= \gamma_0 I + \gamma_{Re} R_{di}^{Re} + \gamma_{Im} R_{di}^{Im}$$

From the above expressions, it may be noted that the phase difference $\Delta\varphi$ and the common scaling factor $|c|^2$ are the only underlying parameters to estimate as additional fitting terms required for adding the spatial modeling term $\gamma R_{di}$ to the parametric model terms $\alpha^{(k)} R^{(k)}$ and $\beta R_n$. In the above representation, one may regard the second parametric model term $\gamma R_{di}$ as being represented by the component terms $\gamma_0 I + \gamma_{Re} R_{di}^{Re} + \gamma_{Im} R_{di}^{Im}$.

As described earlier, by using Eq. (7), the phase information may be estimated separately by isolating the relevant terms. Or, using Eq. (8), the first term may be lumped together with $R_n$ (so that $\gamma_0$ does not need to be estimated separately) and $\gamma_{Re}$ and $\gamma_{Im}$ estimated as regular fitting parameters according to a form of the overall impairment correlations expressed parametrically as, $$R_u = \sum_k \alpha^{(k)} R^{(k)} + \beta' R_n + \gamma_{Re} R_{di}^{Re} + \gamma_{Im} R_{di}^{Im} \quad \text{Eq. 9}$$

Note that $\gamma_{Re}$ and $\gamma_{Im}$ can also assume negative values, unlike $\alpha^{(k)}$ and $\beta'$. (The $\beta'$ notation indicates the jointly estimated $\beta$ and $\gamma_0$ parameters.)

In terms of advantageous fitting parameter estimation, the impairment correlation estimator 14 may be configured in a number of different ways. For example, as may be seen in Eq. (8), the number of useful non-zero terms in the $R_{di}^{Re}$ and $R_{di}^{Im}$ matrices equals N, because only the upper (or lower) triangular part of the matrices is used for fitting parameter estimation. To improve the estimation performance, N should not be too small. In a common or otherwise typical approach to GRake design, up to 8-10 probing fingers are allowed, but, if an AWGN channel is detected, for example, a conventional GRake receiver generally would use only one (or a few) delay positions. However, to ensure good overall fitting parameter estimation performance, particularly given the additional fitting done herein to account for the spatially-modeled dominant interferer, a "full" set of probing fingers may be used even in the case of channels with short delay spread. Doing so increases the amount of data available for parameter estimation. That is, the impairment correlation estimator 14, or another element within the baseband processing circuit 42 may be configured to define and use a desired minimum number of active probing delays for the received signal, for ensuring accurate characterization of the dominant interferer signal, among other things.

Also, it will be appreciated that the particular algorithmic choices made or preferred for fitting parameter estimation is scenario- and implementation-dependent. Estimating all parameters together may be preferred in some cases. That is, the impairment correlation estimator 14 may be configured to dynamically adapt the $\alpha^{(k)}$ for $R^{(k)}$, the $\beta$ for $R_n$, and the $\gamma$ for $R_{di}$, all together in one overall fitting process. (Note that $\gamma$ may comprise multiple individual fitting parameters where the spatial interference matrix $R_{di}$ is expressed as two or more component spatial interference matrices, each having its own fitting parameters. See, e.g., Eq. (8).

Figure 6:
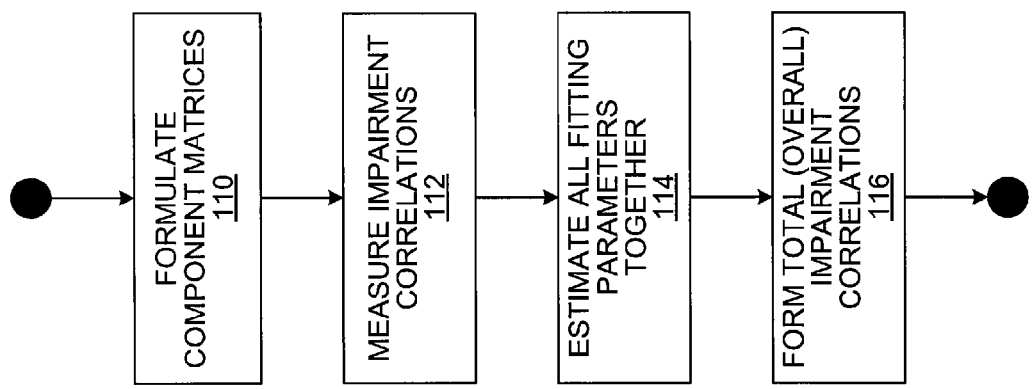

FIG. 6 illustrates one method for estimating all fitting parameters together, wherein the illustrated processing begins with formulating the component matrices $R^{(k)}$, $R_n$, and $R_{di}$ for the overall parametric model (Step 110). The structures or templates for these models may be stored in receiver memory, for example.

Processing continues with measuring impairment correlations (Step 112), such as from received pilot symbols. Processing then continues with estimating all of the parametric model fitting parameters together (Step 114). For example, if the total impairment correlation estimate for the parametric representation is given as $$R_u = \sum_k \alpha^{(k)} R^{(k)} + \beta R_n + \gamma R_{di},$$

then Step 116 may comprise performing an overall LS estimation where $\alpha^{(k)}$, $\beta$, and $\gamma$, are all simultaneously fitted based on the measured impairment correlations obtained from the pilot values.

However, as already mentioned, in at least some contexts, improved estimation of the dominant interferer fitting parameters may be achieved by separating the estimation task for the parameters relating to the dominant interferer spatial interference matrices from the estimation of the other parameters, e.g. by assuming that the other ones are known previously.

Figure 7:
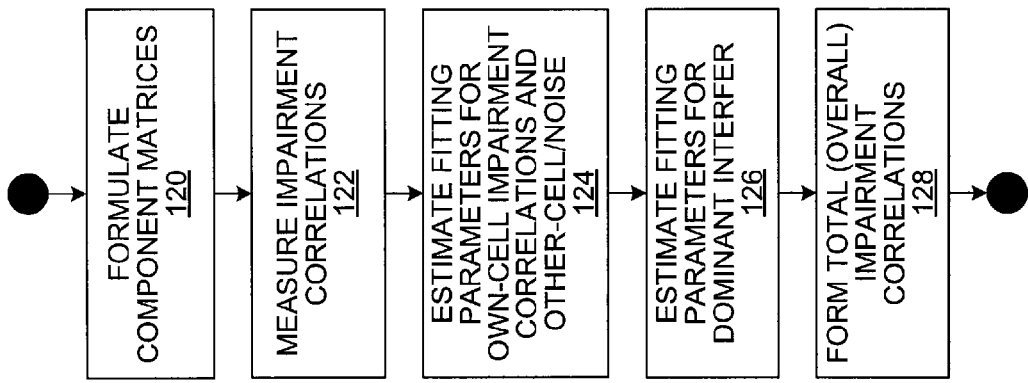
FIGS. 6 and 7 are logic flow diagrams of embodiments of processing logic for combined (FIG. 6) and separate (FIG. 7) fitting of parametric model terms that include a parametric model term for a dominant interferer.

FIG. 7 illustrates a separate estimation process, which begins with the formulation of component matrices (Step 120), which are the matrix representations of the parametric model terms presented in Eq. (2), for example. Working memory in (or accessible to) the impairment correlation estimator 14 may be made available for the construction of data structures embodying or otherwise representing the component matrices that in turn represent the above-described parametric model terms.

Processing continues with the measurement of overall received signal impairment correlations based on signal measurements (Step 122), which may be short-term observations of pilot symbol impairments with a desired level of filtering. The measured impairment correlations serve as observations for fitting parameter estimation in the parametric model, wherein the fitting parameters associated with the component matrices comprising the parametric model terms for same-cell interference and unstructured (white) noise are adapted in their own fitting process (Step 124). As a non-limiting example, a LS fitting process can be used to dynamically determine values for the $\alpha^{(k)}$ and $\beta$ fitting parameters associated with the $R^{(k)}$ and $R_n$ terms, respectively.

Processing then continues with the estimation of the fitting parameter(s) associated with the dominant interferer model term, i.e., the $\gamma$ fitting parameter associated with $R_{di}$ (Step 126). In this regard, as is detailed later herein, the impairment correlation estimator 14 may be configured to carry out first and second fitting processes, wherein it "fits" (adapts) the fitting parameters for $R_{di}$ in a separate fitting process from that used to adapt the fitting parameters for $R^{(k)}$ and $R_n$. The second estimation or fitting process for determining the interferer parameters need not have the same structure as the first fitting process, which is classically an LS fitting operation. The fitting parameters for $R_{di}$ could be determined with improved quality by utilizing the internal structure of the matrix. For example, hypothesis testing could be used to determine the best matching $\Delta\phi$. Notably, in the fitting process carried out for $\gamma R_{di}$, the fitting parameters $\alpha^{(k)}$ and $\beta$ may be treated as known constants, or otherwise fixed. From there, processing continues with forming the parametrically determined overall impairment correlation estimate (Step 128), e.g., forming $$R_u = \sum_k \alpha^{(k)} R^{(k)} + \beta R_n + \gamma R_{di}$$

based on the fitting results.

The fitting parameter estimation task may also be carried out iteratively. For example in one or more embodiments an initial joint solution is first produced, yielding all of the fitting parameters. Then, the $\alpha$ parameters and the $\beta$ parameter are considered constant, and the $R_{di}$ parameters are estimated, such as described immediately above. However, the solution quality may be improved further if the $\alpha$ and $\beta$ parameters are re-estimated. This sequence can be repeated multiple times, e.g., a defined number of iterations or dynamically according to an iteration metric, where each iteration uses the latest available estimates for the parameters that are considered "constant." This approach is particularly advantageous if it is desired to utilize a (potentially better performing) non-LS fitting approach for estimating the $R_{di}$ parameters, or for applying smoothing to the interferer parameters but not to the $\alpha$ and $\beta$ parameters.

Regardless of the particular approach taken for fitting parameter estimation, it is believed that the formulation given in Eq. (9) is an advantageous form for the parametric model used by the impairment correlation estimator 14, at least in parametric GRake implementations of the baseband processing circuit 42. However, other forms may be used as needed or desired. Also, as a further point of flexibility and variation, it should be understood that parametric model forms and model determination processing may be adapted to contexts involving arbitrary Rake finger placements—i.e., placements not constrained as a function of chip delay spacing.

One difference to consider in instances where the Rake finger delay spacing is not based on the chip spacing is the somewhat more complex structure of the $R_{di}^{Re}$ and $R_{di}^{Im}$ matrices, in the sense that receiver pulse filtering effects generally should be considered.

Thus, according to an embodiment taught herein, in case of unconstrained finger placement, the white interference $R_n$ will have entries given as, $$R_n(f_1, f_2) = \begin{cases} P(d_{f_1} - d_{f_2}), & a_{f_1} = a_{f_2} \\ 0, & a_{f_1} \neq a_{f_2} \end{cases} \qquad \text{Eq. (10)}$$

and the dominant interferer spatial matrix $R_{di}$ will have entries given as, $$R_{di}(f_1, f_2) = \begin{cases} P(d_{f_1} - d_{f_2}), & a_{f_1} = a_{f_2} \\ e^{j\Delta\phi} P(d_{f_1} - d_{f_2}), & a_{f_1} \neq a_{f_2} \end{cases} \qquad \text{Eq. (11)}$$

with $\Delta\phi = \phi_{f_1} - \phi_{f_2}$ as before. Here, $P(\cdot)$ is the receiver pulse shape autocorrelation, and the quantities $a_{f_i}$, $d_{f_i}$, and $\phi_{f_i}$ are the receiver antenna index, the delay, and the effective interferer phase of the i-th GRake finger. Note, too, that all terms for the pairs of fingers $(f_1, f_2)$ belonging to the same RX antenna are still the same for $R_n$ and $R_{di}$, and may be merged into a single construction.

One thus arrives at the general expression given in Eq. (9) for the parametric GRake with an unknown spatial interferer. The spatial correlation matrix $R_{di}$ is represented in real and imaginary component form by component matrices for arbitrary finger placement, where those component matrices are formed as, $$R_{di}^{Re} = \text{Re}[R_{di}^{unit}] \qquad \text{Eq. (12)}$$

and $$R_{di}^{Im} = \text{Im}[R_{di}^{unit}] \qquad \text{Eq. (13)}$$

where $$R_{di}^{unit}(f_1, f_2) = \begin{cases} 0, & a_{f_1} = a_{f_2} \\ (1+j)P(d_{f_1} - d_{f_2}), & a_{f_1} = 0, a_{f_2} = 1 \\ (1-j)P(d_{f_1} - d_{f_2}), & a_{f_1} = 1, a_{f_2} = 0 \end{cases} \qquad \text{Eq. (14)}$$

Of course, various other decomposition configurations and fitting parameter allocation approaches, as well as modifications to the estimation schemes may be applied, without changing the underlying idea of spatially modeling a dominant interferer for most or all of the interference suppression gains without taking on the computation burden of fully modeling the structure of the dominant interferer signal.

Independent of any range of contemplated variations for expressing and/or fitting the parametric model, one underlying advantage of the teachings presented herein is the suppression of a dominant interference source, which may well be completely unknown to the receiver in terms of signal structure, etc., while incurring only low computational complexity. In a cellular context, for example, the wireless communication device 12 may cancel all or most of the interference of an adjacent cell or sector transmitter without fully modeling it, i.e., by modeling it as spatial interferer hypothesized as a point-source of interference propagating along single-path propagation channels to each of two or more receiver antennas.

As such, the parametric modeling presented herein is particularly useful for, but not limited to, situations where one individual strong interferer, besides the intended transmission, is encountered. A good example of that is the wireless communication device 12 receiving from one network transmitter while another network transmitter or another localized signal source is interfering.

Further, while the parametric modeling presented herein has direct applicability to Wideband Code Division Multiple Access (WCDMA) systems, where the wireless communication network 8 and the wireless communication device 12 are configured to support WCDMA-based air interface protocols, those skilled in the art will appreciate that the methods and apparatuses presented herein also are directly applicable to other systems, and to other receiver structures.

Figure 8:
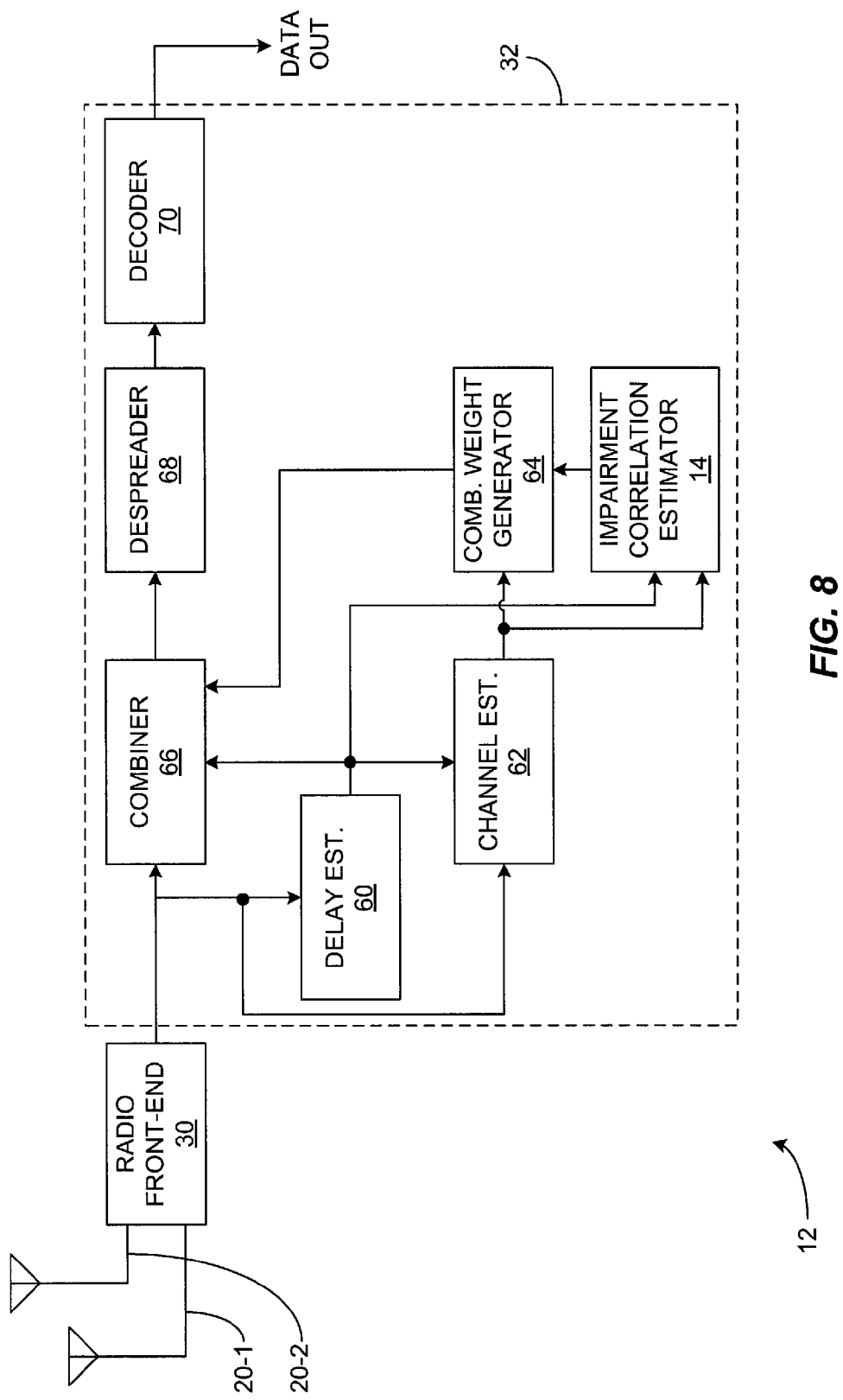
FIG. 8 is a logic flow diagram of one embodiment of a Chip Equalizer (CE) configuration of the wireless communication device of FIGS. 1 and 2.

As one example of another receiver structure, FIG. 8 illustrates an embodiment of the wireless communication device 12 where the baseband processing circuit 32 is configured as an LMMSE CE receiver. One sees that the illustrated CE embodiment of the baseband processing circuit 32 includes a delay estimator 60, a channel estimator 62, a combining weight generator 64, a combiner 66, a despreader 68, and a decoder 70.

Rather than using a plurality of despreaders 68 as used in the GRake embodiment to create a plurality of despread signals for combining, the CE embodiment uses one despreader 68 positioned after combiner 66, which operates as a multi-tap filter that combines differently delayed samples of the received signal according to a set of (filter) tap weights generated from the combining weight generator 64.

As with the combining weight generator 50 illustrated in FIG. 5, here the combining weights are generated at least in part from the overall impairment correlation estimates represented in the parametric model maintained by the impairment correlation estimator 14. However, rather than weighting the (Rake) finger signals from individual ones of the despreaders 46, the combining weights are used here as filter tap weights, to effect interference suppression, including suppression of the dominant interferer by virtue of its spatial representation in the parametric model. Thus, where the GRake embodiment characterized the dominant interferer in terms of its spatial correlations across receiver antennas for the same despreader delays, the CE embodiment characterizes the dominant interferer in terms of spatial correlations across receiver antennas for the same equalization filter tap delays.

With these and other variations and extensions in mind, those skilled in the art will appreciate that the foregoing description and the accompanying drawings represent non-limiting examples of the methods and apparatus taught herein for interference suppression. As such, the present invention is not limited by the foregoing description and accompanying drawings. Instead, the present invention is limited only by the following claims and their legal equivalents.

What is claimed is:

1. A method of determining received signal impairment correlations for use in processing a received signal at a wireless communication device, the method comprising:
    modeling impairment correlations arising from same-cell interference via a first, multipath parametric model term;
    modeling impairment correlations arising from a dominant interferer signal via one or more second, single-path parametric model terms that treat the dominant interferer signal as a point source signal emanating along single paths to each of two or more receiver antennas; and
    determining overall impairment correlations for the received signal based on dynamically fitting the first and second parametric model terms to impairment correlation measurements taken for the received signal.

2. The method of claim 1, further comprising modeling impairment correlations arising from other-cell interference and noise as white noise via a third parametric model term, and wherein determining the overall impairment correlations for the received signal includes dynamically fitting the third parametric model term to the impairment correlation measurements.

3. The method of claim 1, wherein modeling the impairment correlations arising from the dominant interferer signal via the one or more second, single-path parametric model terms comprises using one or more spatial correlation matrices to represent the impairment correlations arising from the dominant interferer signal in terms of its spatial correlations at like processing delays across two or more receiver antennas.

4. The method of claim 1, further comprising defining and using a desired minimum number of active probing delays to be used for the received signal, for ensuring accurate characterization of the dominant interferer signal.

5. The method of claim 1, wherein the dominant interferer signal originates from an interfering transmitter for which the wireless communication device maintains multipath channel estimates, and wherein modeling the impairment correlations arising from the dominant interferer signal via the one or more second, single-path parametric model terms comprises determining single-path channel coefficients for use in the second parametric model terms from the multipath channel estimates maintained for the interfering transmitter.

6. The method of claim 5, wherein determining the single-path channel coefficients comprises identifying, for each of the two or more receiver antennas, a strongest one of the multipath channel coefficients.

7. The method of claim 5, wherein determining the single-path channel coefficients comprises forming a single-path composite channel coefficient for each of the two or more receiver antennas based on corresponding ones of the multipath channel coefficients.

8. The method of claim 5, wherein modeling the impairment correlations arising from the dominant interferer signal via the one or more second, single-path parametric model terms comprises forming a spatial interference matrix having zero elements everywhere except for blocks of self-correlation and cross-correlation matrix elements down its diagonal for the single-path channel coefficients for the two or more receiver antennas.

9. The method of claim 1, wherein unknown single-path channel coefficients relate the dominant interferer signal to each of the two or more receiver antennas, and wherein modeling the impairment correlations arising from the dominant interferer signal via the one or more second, single-path parametric model terms comprises forming a spatial interference matrix as a function of the relative magnitudes of the single-path channel coefficients and their relative phase differences.

10. The method of claim 9, further comprising reducing one or more matrix elements of the spatial interference matrix to unity by assuming equal relative magnitudes for the single-path channel coefficients.

11. The method of claim 9, wherein determining the overall impairment correlations for the received signal based on dynamically fitting the first and second parametric model terms to the impairment correlation measurements taken for the received signal comprises carrying out a separate first and second fitting processes, said first fitting process involving model fitting parameters not associated with the spatial interference matrix and said second fitting process involving model fitting parameters associated with the spatial interference matrix.

12. The method of claim 9, wherein forming the spatial interference matrix as the function of the relative magnitudes of the single-path channel coefficients and their relative phase differences comprises forming a structured set of constant-valued spatial interference matrices, each having a scaling value that is a function of any one or more of the relative phase differences and the single-path channel coefficients.

13. The method of claim 12, wherein determining the overall impairment correlations for the received signal based on dynamically fitting the first and second parametric model terms to the impairment correlation measurements taken for the received signal comprises treating the scaling values for the spatial interference matrices as parametric model fitting parameters, such that the single-path channel coefficients and their relative phase differences are implicitly solved via a model fitting process.

14. The method of claim 1, further comprising forming combining weights based at least in part on the overall impairment correlations and using the combining weights in a linear equalization process for interference suppression.

15. A receiver circuit configured to determine received signal impairment correlations for use in processing a received signal, the receiver circuit comprising one or more processing circuits configured to:
model impairment correlations arising from same-cell interference via a first, multipath parametric model term;
model impairment correlations arising from a dominant interferer signal via one or more second, single-path parametric model terms that treat the dominant interferer signal as a point source signal emanating along single paths to each of two or more receiver antennas; and
determine overall impairment correlations for the received signal based on dynamically fitting the first and second parametric model terms to impairment correlation measurements taken for the received signal.

16. The receiver circuit of claim 15, wherein the one or more processing circuits of the receiver circuit comprise an impairment correlation measurement circuit configured to provide the impairment correlation measurements for the received signal and a fitting circuit configured to determine the overall impairment correlations for the received signal by dynamically fitting the first and second parametric model terms to the impairment correlation measurements provided by the impairment correlation measurement circuit.

17. The receiver circuit of claim 16, further comprising a modeling circuit configured to maintain or otherwise provide the first and second parametric model terms.

18. The receiver circuit of claim 15, further comprising a combining weight generator configured to generate combining weights for suppressing interference in the received signal, based at least in part on the overall impairment correlations.

19. The receiver circuit of claim 15, wherein the one or more processing circuits comprising the receiver circuit comprise at least a portion of a programmed baseband signal processor in a wireless communication device.

20. The receiver circuit of claim 15, wherein the receiver circuit is configured to model impairment correlations arising from other-cell interference and noise as white noise via a third parametric model term, and to determine the overall impairment correlations for the received signal by including the third parametric model term its dynamic fitting operations.

21. The receiver circuit of claim 15 wherein the receiver circuit is configured to model the impairment correlations arising from the dominant interferer signal using one or more spatial correlation matrices to represent the impairment correlations arising from the dominant interferer signal in terms of its spatial correlations at like processing delays across two or more receiver antennas.

22. The receiver circuit of claim 15, wherein the dominant interferer signal originates from an interfering transmitter for which multipath channel estimates are available to the receiver circuit, and wherein the receiver circuit is configured to model the impairment correlations arising from the dominant interferer signal via the one or more second, single-path parametric model terms based on determining single-path channel coefficients for use in the second parametric model terms from the multipath channel estimates maintained for the interfering transmitter.

23. The receiver circuit of claim 22, wherein the receiver circuit is configured to determine the single-path channel coefficients by identifying, for each of the two or more receiver antennas, a strongest one of the multipath channel coefficients.

24. The receiver circuit of claim 22, wherein the receiver circuit is configured to determine the single-path channel coefficients by forming a single-path composite channel coefficient for each of the two or more receiver antennas based on corresponding ones of the multipath channel coefficients.

25. The receiver circuit of claim 22, wherein the receiver circuit is configured to model the impairment correlations arising from the dominant interferer signal via the one or more second, single-path parametric model terms by forming a spatial interference matrix having zero elements everywhere except for blocks of self-correlation and cross-correlation matrix elements down its diagonal for the single-path channel coefficients for the two or more receiver antennas.

26. The receiver circuit of claim 15, wherein unknown single-path channel coefficients relate the dominant interferer signal to each of the two or more receiver antennas, and wherein the receiver circuit is configured to model the impairment correlations arising from the dominant interferer signal via the one or more second, single-path parametric model terms by forming a spatial interference matrix as a function of the relative magnitudes of the single-path channel coefficients and their relative phase differences.

27. The receiver circuit of claim 26, wherein the receiver circuit is configured to reduce one or more matrix elements of the spatial interference matrix to unity by assuming equal relative magnitudes for the single-path channel coefficients.

28. The receiver circuit of claim 26, wherein the receiver circuit is configured to determine the overall impairment correlations for the received signal based on dynamically fitting the first and second parametric model terms to the impairment correlation measurements taken for the received signal by carrying out a separate first and second fitting processes, said first fitting process involving model fitting parameters not associated with the spatial interference matrix and said second fitting process involving model fitting parameters associated with the spatial interference matrix.

29. The receiver circuit of claim 26, wherein the receiver circuit is configured to form the spatial interference matrix as the function of the relative magnitudes of the single-path channel coefficients and their relative phase differences by forming a structured set of spatial interference matrices having constant-valued matrix elements, each such spatial interference matrix having a variable scaling value that is a function of any one or more of the relative phase differences and the single-path channel coefficients.

30. The receiver circuit of claim 29, wherein the receiver circuit is configured to determine the overall impairment correlations for the received signal based on dynamically fitting the first and second parametric model terms to the impairment correlation measurements taken for the received signal based on treating the variable scaling values for the spatial interference matrices as parametric model fitting parameters, such that the single-path channel coefficients and their relative phase differences are implicitly solved via a model fitting process.

31. The receiver circuit of claim 29, wherein the receiver circuit comprises part of a linear equalization circuit, and wherein the linear equalization circuit is configured to form combining weights based at least in part on the overall impairment correlations and use the combining weights in a corresponding linear equalization process for interference suppression.

32. A wireless communication device including the receiver circuit of claim 15 and having two or more receiver antennas associated therewith.

* * * * *

UNITED STATES PATENT AND TRADEMARK OFFICE
CERTIFICATE OF CORRECTION

PATENT NO. : 7,822,101 B2  Page 1 of 1
APPLICATION NO. : 11/767905
DATED : October 26, 2010
INVENTOR(S) : Reial It is certified that error appears in the above-identified patent and that said Letters Patent is hereby corrected as shown below:

In Column 7, Line 67, in Equation (3) delete "$|c_1|^2$" and insert -- $|c_1|^2$ --, therefor.

Signed and Sealed this
Nineteenth Day of April, 2011

David J. Kappos
*Director of the United States Patent and Trademark Office*